US012811196B2

(12) United States Patent
Wu et al.

(10) Patent No.: US 12,811,196 B2
(45) Date of Patent: Nov. 24, 2026

(54) SECONDARY BATTERY, METHOD FOR PREPARING SECONDARY BATTERY, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Zeli Wu, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 639 days.

(21) Appl. No.: 18/231,794

(22) Filed: Aug. 9, 2023

(65) Prior Publication Data

US 2023/0395860 A1 Dec. 7, 2023

Related U.S. Application Data

(63) Continuation of application No. PCT/CN2022/121240, filed on Sep. 26, 2022.

(30) Foreign Application Priority Data

Nov. 9, 2021 (CN) ........................ 202111321034.7

(51) Int. Cl.
*H01M 10/0568* (2010.01)
*H01M 4/02* (2006.01)
(Continued)

(52) U.S. Cl.
CPC ....... *H01M 10/0568* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

| | | | | |
|---|---|---|---|---|
| 2016/0149263 A1* | 5/2016 | Hallac | ............... | H01M 10/0568 429/163 |
| 2019/0288336 A1* | 9/2019 | Park | .................. | H01M 10/4235 |
| 2022/0109190 A1* | 4/2022 | Liang | ................ | H01M 10/0525 |

FOREIGN PATENT DOCUMENTS

| | | |
|---|---|---|
| CN | 105186039 A | 12/2015 |
| CN | 109244530 A | 1/2019 |

(Continued)

OTHER PUBLICATIONS

Office Action issued Jun. 28, 2025 in Chinese Patent Application No. 202111321034.7 with English translation thereof.

(Continued)

*Primary Examiner* — Scott J. Chmielecki
(74) *Attorney, Agent, or Firm* — XSENSUS LLP

(57) ABSTRACT

A secondary battery may comprise an electrolyte solution and a positive electrode plate, wherein the positive electrode plate may comprise a layered material with a molecular formula of $Li_aNi_bCo_cM1_dM2_eO_fA_g$, M1, M2, A, a, b, c, d, e, f, and g being as defined herein respectively; and the electrolyte solution may comprise lithium difluoro(oxalato) borate, based on the total mass of the electrolyte solution, the percentage mass content of the lithium difluoro(oxalato) borate being x %, with $0<x\leq1.0$, and the secondary battery satisfies $c+x/10\geq0.10$.

10 Claims, 2 Drawing Sheets

5

(51) Int. Cl.
*H01M 4/131* (2010.01)
*H01M 4/505* (2010.01)
*H01M 4/525* (2010.01)

(52) U.S. Cl.
CPC ...... *H01M 4/525* (2013.01); *H01M 2004/028* (2013.01); *H01M 2300/004* (2013.01)

(56) References Cited

FOREIGN PATENT DOCUMENTS

| | | | |
|---|---|---|---|
| CN | 110085913 | A | 8/2019 |
| CN | 110660962 | A | 1/2020 |
| CN | 110783628 | A | 2/2020 |
| CN | 110797575 | A | 2/2020 |
| CN | 111048840 | A | 4/2020 |
| CN | 111509298 | A | 8/2020 |
| CN | 113451646 | A | 9/2021 |
| JP | 2013-030284 | A | 2/2013 |
| JP | 2018-125313 | A | 8/2018 |
| JP | 2018-206523 | A | 12/2018 |
| JP | 2020-161466 | A | 10/2020 |
| JP | 2023-533380 | A | 8/2023 |
| KR | 10-2016-0117961 | A | 10/2016 |
| KR | 10-2017-0048915 | A | 5/2017 |
| KR | 10-2017-0061017 | A | 6/2017 |
| KR | 2019-0058134 | A | 5/2019 |
| KR | 10-2019-0143566 | A | 12/2019 |
| KR | 10-2020-0126781 | A | 11/2020 |
| WO | 2020/248567 | A1 | 12/2020 |
| WO | 2021/093265 | A1 | 5/2021 |
| WO | 2021/172175 | A1 | 9/2021 |

OTHER PUBLICATIONS

Extended European Search Report issued Jan. 23, 2025 in European Patent Application No. 22891668.0.
Jang-Yeon Hwang, et al., "Customizing a Li-metal battery that survives practical operating conditions for electric vehicle applications", Energy & Environmental Science, vol. 12, No. 7, Jun. 7, 2019, pp. 2174-2184, XP093238804.
Office Action issued Mar. 26, 2025 in Korean Patent Application No. 10-2023-7025511 with English translation thereof.
Office Action issued Nov. 5, 2024 in Japanese Patent Application No. 2023-546553 with English translation thereof.
International Search Report and Written Opinion mailed on Nov. 29, 2022, received for PCT Application PCT/CN2022/121240, filed on Sep. 26, 2022, 11 pages including English Translation.
Notice of Allowance issued Sep. 19, 2025 in Korean Patent Application No. 10-2023-7025511 with English translation thereof.

* cited by examiner

SECONDARY BATTERY, METHOD FOR PREPARING SECONDARY BATTERY, BATTERY MODULE, BATTERY PACK, AND ELECTRICAL APPARATUS

CROSS-REFERENCE TO RELATED APPLICATIONS

The present application is a continuation of International Application No. PCT/CN2022/121240, filed Sep. 26, 2022, which claims the priority of Chinese Patent Application No. 202111321034.7 filed on Nov. 9, 2021 and entitled "SECONDARY BATTERY, METHOD FOR PREPARING SECONDARY BATTERY, BATTERY MODULE, BATTERY PACK, AND ELECTRICAL APPARATUS", the entire content of each of which is incorporated herein by reference.

TECHNICAL FIELD

The present application belongs to the technical field of batteries, and specifically relates to a secondary battery, a method for preparing a secondary battery, a battery module, a battery pack and an electrical apparatus.

BACKGROUND ART

Secondary batteries rely on lithium ions to intercalate and deintercalate back and forth between the positive and negative electrodes for charging and discharging, and they have outstanding features such as high energy density, long cycle life, no pollution, and memoryless effect. Therefore, as a clean energy source, secondary batteries have gradually spread from electronic products to energy storage power source systems such as hydraulic power, firepower, wind power and solar power stations, as well as electric tools, electric bicycles, electric motorcycles, electric vehicles, military equipment, aerospace and other fields to adapt to the sustainable development strategy of environment and energy. Cobalt is an important component element of the positive electrode active material of the secondary battery. However, the content of cobalt in the crust is small, and it is difficult to mine and expensive. Therefore, low cobalt or no cobalt has become an inevitable development trend for the positive electrode active material. However, cobalt contributes a lot to the lithium ion diffusion rate of the positive electrode active material, and low cobalt or no cobalt will reduce the lithium ion diffusion rate of the positive electrode active material and affect the cycle life of the secondary battery.

SUMMARY OF THE DISCLOSURE

An objective of the present application is to provide a secondary battery, a method for preparing a secondary battery, a battery module, a battery pack, and an electrical apparatus so as to improve the lithium ion diffusion rate of a low-cobalt or cobalt-free positive electrode active material, and improve the cycling performance of the secondary battery.

A first aspect of the present application provides a secondary battery comprising an electrolyte solution and a positive electrode plate. The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \le a \le 1.2$, $0<b<0.98$, $0 \le c<0.1$, $0<d<0.5$, $0 \le e \le 0.5$, $0 \le f \le 2$, $0 \le g \le 2$, $b+c+d+e=1$, and $f+g=2$. The electrolyte solution comprises lithium difluoro(oxalato)borate, and based on the total mass of the electrolyte solution, the percentage mass content of the lithium difluoro(oxalato)borate is x %, with $0<x \le 1.0$. The secondary battery satisfies $c+x/10 \ge 0.10$.

After a lot of research, the inventors found that the cobalt content c of the low-cobalt or cobalt-free positive electrode active material is closely related to the percentage mass content x % of lithium difluoro(oxalato)borate in the electrolyte solution. When the cobalt content c of the low-cobalt or cobalt-free positive electrode active material and the percentage mass content x % of lithium difluoro(oxalato)borate in the electrolyte solution satisfy $c+x/10 \ge 0.10$, the B atom in the lithium difluoro(oxalato)borate can fully bind to the O atom in the positive electrode active material, which better reduces the diffusion resistance of lithium ions in the bulk phase of the low-cobalt or cobalt-free positive electrode active material, and avoids excessive dilithiation on the surface of the low-cobalt or cobalt-free positive electrode active material, thereby helping to better stabilize the crystalline structure of the low-cobalt or cobalt-free positive electrode active material and improve the diffusion rate of lithium ions. Therefore, the secondary battery can have good high-temperature storage performance while having significantly improved cycling performance.

In the case of $c+x/10<0.10$, the content of lithium difluoro(oxalato)borate in the electrolyte solution is not enough to enable the formation of a low-impedance protective film with excellent performance on the surface of the low-cobalt or cobalt-free positive electrode active material, and lithium difluoro(oxalato)borate cannot effectively reduce the charge transfer resistance of the low-cobalt or cobalt-free positive electrode active material, cannot effectively reduce the diffusion resistance of lithium ions in the bulk phase of the low-cobalt or cobalt-free positive electrode active material and inhibit the excessive dilithiation on the surface of the low-cobalt or cobalt-free positive electrode active material. Therefore, it is difficult for the secondary battery to have significantly improved cycling performance.

In any embodiment of the present application, the electrolyte solution further comprises one or more of fluoroethylene carbonate and lithium fluorosulfonylimide.

Optionally, the molecular formula of the lithium fluorosulfonylimide is $LiN(SO_2R_1)(SO_2R_2)$, wherein $R_1$ and $R_2$ each independently represent F, or $C_nF_{2n+1}$, and n is an integer from 1 to 10.

Optionally, the lithium fluorosulfonylimide comprises one or both of lithium bis(fluorosulfonyl)imide and lithium bis(trifluoromethanesulfonyl)imide.

In any embodiment of the present application, based on the total mass of the electrolyte solution, the percentage mass content of the fluoroethylene carbonate is y %, with $0 \le y \le 2.5$. Optionally, it satisfies $0<y \le 2.0$.

In any embodiment of the present application, based on the total mass of the electrolyte solution, the percentage mass content of the lithium fluorosulfonylimide is z %, with $0 \le z \le 2.5$. Optionally, it satisfies $0<z \le 2.0$.

After adding fluoroethylene carbonate to the electrolyte solution, it can effectively improve the cycling performance of the secondary battery; fluoroethylene carbonate is resistant to high-voltage oxidation, which is conducive to matching high-voltage positive electrode active materials, thereby helping to improve the energy density of the secondary battery. After adding the lithium fluorosulfonylimide into the electrolyte solution, the rate performance and low-temperature performance of the secondary battery can be significantly improved.

In any embodiment of the present application, the secondary battery further satisfies $0.5 \leq y/x \leq 2.0$. Optionally, it satisfies $0.5 \leq y/x \leq 1.0$. In this case, the synergistic effect of lithium difluoro(oxalato)borate and fluoroethylene carbonate can be fully utilized, which not only will not increase the gas evolution of the secondary battery, but will further improve the cycling performance and energy density of the secondary battery.

In any embodiment of the present application, the secondary battery further satisfies $0.5 \leq x/z \leq 2.0$. Optionally, it satisfies $0.5 \leq x/z \leq 1.5$. In this case, the synergistic effect of lithium difluoro(oxalato)borate and lithium fluorosulfonylimide can be fully utilized, which not only will not deteriorate the cycling performance of the secondary battery, but can further improve the rate performance and low-temperature performance of the secondary battery.

In any embodiment of the present application, the secondary battery further satisfies $0.5 \leq y/x \leq 2.0$ and $0.55 \leq x/z \leq 2.0$. Optionally, the secondary battery further satisfies $0.55 \leq y/x \leq 2.0$, $0.5 \leq x/z \leq 2.0$ and $0.25 \leq y/z \leq 2.0$ simultaneously. In this case, the secondary battery has significantly improved cycling performance, storage performance, rate performance, and low-temperature performance simultaneously.

A second aspect of the present application provides a method for preparing a secondary battery, comprising at least the following steps:

step 1, assembling a positive electrode plate, a separator, a negative electrode plate, and an electrolyte solution into a secondary battery, wherein the positive electrode plate comprises a layered material with a molecular formula of $Li_aNi_bCo_cM1_dM2_eO_fA_g$, M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.85 \leq a \leq 1.2$, $0<b<0.98$, $0 \leq c<0.1$, $0<d<0.5$, $0 \leq e \leq 0.5$, $0 \leq f \leq 2$, $0 \leq g \leq 2$, $b+c+d+e=1$, and $f+g=2$; the electrolyte solution comprises lithium difluoro(oxalato)borate, optional fluoroethylene carbonate, and optional lithium fluorosulfonylimide; based on the total mass of the electrolyte solution, the percentage mass content of the lithium difluoro(oxalato)borate is x %, with $0<x \leq 1.0$, based on the total mass of the electrolyte solution, the percentage mass content of the fluoroethylene carbonate is y %, with $0 \leq y \leq 2.5$, and based on the total mass of the electrolyte solution, the percentage mass content of the lithium fluorosulfonylimide is z %, with $0 \leq z \leq 2.5$; and step 2, selecting secondary batteries satisfying $c+x/10 \geq 0.10$ from the secondary batteries obtained in step 1.

When the secondary battery satisfies $c+x/10 \geq 0.10$, the B atom in the lithium difluoro(oxalato)borate can fully bind to the O atom in the positive electrode active material, which better reduces the diffusion resistance of lithium ions in the bulk phase of the low-cobalt or cobalt-free positive electrode active material, and avoids excessive dilithiation on the surface of the low-cobalt or cobalt-free positive electrode active material, thereby helping to better stabilize the crystalline structure of the low-cobalt or cobalt-free positive electrode active material and improve the diffusion rate of lithium ions. Therefore, the secondary batteries obtained by the preparation method of the present application can have both significantly improved cycling performance and good high-temperature storage performance.

In any embodiment of the present application, the method further comprises a step of selecting secondary batteries satisfying $0.5 \leq y/x \leq 2.0$ from the secondary batteries obtained in step 2. In this case, the prepared secondary battery has good storage performance and significantly improved cycling performance and energy density simultaneously.

In any embodiment of the application, the method further comprises a step of selecting secondary batteries satisfying $0.5 \leq x/z \leq 2.0$ from the secondary batteries obtained in step 2. In this case, the prepared secondary battery has good storage performance and significantly improved cycling performance, rate performance, and low-temperature performance simultaneously.

In any embodiment of the present application, the method further comprises a step of selecting secondary batteries simultaneously satisfying $0.55 \leq y/x \leq 2.0$ and $0.5 \leq x/z \leq 2.0$ from the secondary batteries obtained in step 2. In this case, the prepared secondary battery has good storage performance and significantly improved cycling performance, rate performance, and low-temperature performance simultaneously.

In any embodiment of the present application, the method further comprises a step of selecting secondary batteries simultaneously satisfying $0.55 \leq y/x \leq 2.0$, $0.5 \leq x/z \leq 2.0$ and $0.25 \leq y/z \leq 2.0$ from the secondary batteries obtained in step 2. In this case, the prepared secondary battery has good storage performance and significantly improved cycling performance, rate performance, and low-temperature performance simultaneously.

A third aspect of the present application provides a battery module comprising one of the secondary battery of the first aspect of the present application and the secondary battery prepared by the method of the second aspect of the present application.

A fourth aspect of the present application provides a battery pack comprising one of the secondary battery of the first aspect of the present application, the secondary battery prepared by the method of the second aspect of the present application, and the battery module of the third aspect of the present application.

A fifth aspect of the present application provides an electrical apparatus comprising at least one of the secondary battery of the first aspect of the present application, the secondary battery prepared by the method of the second aspect of the present application, the battery module of the third aspect of the present application, and the battery pack of the fourth aspect of the present application.

The battery module, battery pack, and electrical apparatus of the present application comprise the secondary battery provided by the present application, and thus have at least the same advantages as those of the secondary battery.

DESCRIPTION OF DRAWINGS

In order to more clearly illustrate the technical solutions of the embodiments of the present application, the drawings to be used in embodiments of the present application will be briefly introduced below. Apparently, the drawings described below are merely some embodiments of the present application. For those of ordinary skills in the art, other drawings may also be obtained based on these drawings without creative work.

DETAILED DESCRIPTION

Figure 1:
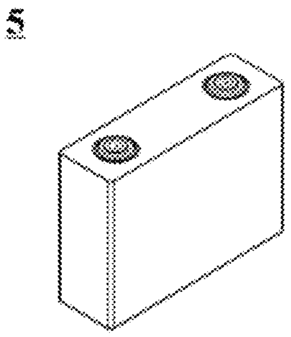
FIG. 1 is a schematic diagram of an embodiment of a secondary battery according to the present application.

Hereinafter, the embodiments of the secondary battery, method for preparing a secondary battery, battery module, battery pack and electrical apparatus of the present application are specifically disclosed by referring to the detailed description of the drawings as appropriate. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specifically stated, all embodiments and optional embodiments of the present application may be combined with each other to form new technical solutions, and such technical solutions should be considered as being included in the disclosure of the present application.

Unless otherwise specifically stated, all technical features and optional technical features of the present application may be combined with each other to form new technical solutions, and such technical solutions should be considered as being included in the disclosure of the present application.

Unless otherwise specifically stated, all steps in the present application may be performed sequentially or randomly, and are preferably performed sequentially. For example, the method includes steps (a) and (b), indicating that the method may include steps (a) and (b) performed sequentially, or may include steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specifically stated, the "including" and "comprising" mentioned in the present application mean open-ended, or may be closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

Secondary batteries, also known as rechargeable batteries or storage batteries, refer to batteries that, after being discharged, can activate active materials by charging for continuous use. Generally, the secondary battery pack includes a positive electrode plate, a negative electrode plate, a separator and an electrolyte solution. During the charge and discharge process of the secondary battery, lithium ions are intercalated and deintercalated repeatedly between the positive electrode plate and the negative electrode plate. The separator is provided between the positive electrode plate and the negative electrode plate, and mainly functions to prevent a short circuit between the positive electrode and the negative electrode while allowing ions to pass through. The electrolyte solution serves to conduct lithium ions between the positive electrode plate and the negative electrode plate.

When the secondary battery is charged, lithium ions are preferentially deintercalated from the surface of the positive electrode active material, and then the lithium ions in the bulk phase of the positive electrode active material are replenished to the surface in time. When the cobalt content of the positive electrode active material is high, lithium ions in the bulk phase of the positive electrode active material can be replenished to the surface of the positive electrode active material in time. However, when the cobalt content of the positive electrode active material is low, the lithium ions in the bulk phase of the positive electrode active material have no time to be replenished to the surface of the positive electrode active material, whereas the lithium ions on the surface have already been deintercalated, which will lead to over-dilithiation of the surface of the positive electrode active material, thereby affecting the crystalline structure of the positive electrode active materials (for example, irreversible distortion of positive electrode active materials and increase of lattice defects), and reducing the cycling performance of secondary batteries. Therefore, it is of great practical significance to improve the lithium ion diffusion rate of low-cobalt or cobalt-free positive electrode active materials.

After extensive research, the inventors proposed a low-cobalt or cobalt-free secondary battery with significantly improved lithium ion diffusion rate and cycling performance.

A first aspect of the embodiments of the present application provides a secondary battery comprising an electrolyte solution and a positive electrode plate. The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \le a \le 1.2$, $0<b<0.98$, $0 \le c<0.1$, $0<d<0.5$, $0 \le e \le 0.5$, $0 \le f \le 2$, $0 \le g \le 2$, $b+c+d+e=1$, and $f+g=2$. The electrolyte solution comprises lithium difluoro(oxalato)borate (LiDFOB), and based on the total mass of the electrolyte solution, the percentage mass content of the lithium difluoro(oxalato) borate is x %, with $0<x \le 1.0$. The secondary battery satisfies $c+x/10 \ge 0.10$.

Researchers have been working on improving the lithium ion diffusion rate of low-cobalt or cobalt-free positive electrode active materials, but there is no good solution yet.

The inventors of the present application unexpectedly discovered that after adding lithium difluoro(oxalato)borate into the electrolyte solution, lithium difluoro(oxalato)borate can form a low-impedance protective film on the surface of the positive electrode active material, and the B atom in lithium difluoro(oxalato)borate is prone to binding to the O atom in the positive electrode active material to reduce the charge transfer resistance of the positive electrode active material, thereby reducing the diffusion resistance of lithium ions in the bulk phase of the positive electrode active material. Therefore, after adding lithium difluoro(oxalato) borate into the electrolyte solution, the low-cobalt or cobalt-free positive electrode active material can have significantly improved lithium ion diffusion rate, and the lithium ions in the bulk phase of the low-cobalt or cobalt-free positive electrode active material can be timely replenished to the surface to avoid excessive dilithiation on the surface of low-cobalt or cobalt-free positive electrode active materials, thereby stabilizing the crystalline structure of low-cobalt or cobalt-free positive electrode active materials. The crystalline structure of the low-cobalt or cobalt-free positive electrode active material of the present application is more stable, which can greatly reduce the probability of problems including unstable structural properties, chemical properties or electrochemical properties of the positive electrode active material due to excessive dilithiation on the surface of the low-cobalt or cobalt-free positive electrode active material, such as problems of irreversible distortion of the positive electrode active material and increased lattice defects.

Lithium difluoro(oxalato)borate itself is not resistant to oxidation, and too much of it will deteriorate the storage performance of the secondary battery, especially the storage performance under high temperature environment. Therefore, the amount of lithium difluoro(oxalato)borate added should be moderate.

After a lot of research, the inventors found that the cobalt content c of the low-cobalt or cobalt-free positive electrode active material is closely related to the percentage mass content x % of lithium difluoro(oxalato)borate in the electrolyte solution. When the cobalt content c of the low-cobalt or cobalt-free positive electrode active material and the percentage mass content x % of lithium difluoro(oxalato) borate in the electrolyte solution satisfy $c+x/10 \ge 10$, the B atom in the lithium difluoro(oxalato)borate can fully bind to the O atom in the positive electrode active material, which better reduces the diffusion resistance of lithium ions in the bulk phase of the low-cobalt or cobalt-free positive electrode active material, and avoids excessive dilithiation on the surface of the low-cobalt or cobalt-free positive electrode active material, thereby helping to better stabilize the crystalline structure of the low-cobalt or cobalt-free positive electrode active material and improve the diffusion rate of lithium ions. Therefore, the secondary battery can have good high-temperature storage performance while having significantly improved cycling performance. In some embodiments, $c+x/10$ can be $\ge 0.10$, $\ge 0.11$, $\ge 0.12$, $\ge 0.13$, $\ge 0.14$, 0.15, $\ge 0.16$, $\ge 0.17$, $\ge 0.18$, or $\ge 0.19$.

In the case of $c+x/10<0.10$, the content of lithium difluoro (oxalato)borate in the electrolyte solution is not enough to enable the formation of a low-impedance protective film with excellent performance on the surface of the low-cobalt or cobalt-free positive electrode active material, and lithium difluoro(oxalato)borate cannot effectively reduce the charge transfer resistance of the low-cobalt or cobalt-free positive electrode active material, cannot effectively reduce the diffusion resistance of lithium ions in the bulk phase of the low-cobalt or cobalt-free positive electrode active material and inhibit the excessive dilithiation on the surface of the low-cobalt or cobalt-free positive electrode active material. Therefore, it is difficult for the secondary battery to have significantly improved cycling performance.

In some embodiments, the layered material with the molecular formula of $Li_aNi_bCo_cM1_dM2_eO_fA_g$ is optionally modified by doping with M2 cations, by doping with A anions, or by doping with both M2 cations and A anions, and the crystalline structure of the layered material obtained after doping is more stable, which can further improve the electrochemical performance of the secondary battery, such as cycling performance and rate performance.

In some embodiments, A is selected from F. After being modified by doping with F, the structure of $Li_aNi_bCo_cM1_dM2_eO_fA_g$ is more stable, which can make the secondary battery have better cycling performance and rate performance.

In some embodiments, M1 is selected from Mn.

In some embodiments, M1 is selected from Al.

In some embodiments, M1 is selected from a combination of Mn and Al. The molar ratio of Mn to Al is not particularly limited and may be selected based on actual requirements.

In some embodiments, it satisfies $0.50 \le b<0.98$. Optionally, it satisfies $0.55 \le b<0.98$, $0.60 \le b<0.98$, $0.65 \le b<0.98$, $0.70 \le b<0.98$, $0.75 \le b<0.98$, $0.80 \le b<0.98$.

In some embodiments, it satisfies $c=0$.

In some embodiments, it satisfies $0<c<0.1$. Optionally, it satisfies $0<c \le 0.09$, $0<c \le 0.08$, $0<c \le 0.07$, $0<c \le 0.06$, $0<c \le 0.05$, $0<c \le 0.04$, $0<c \le 0.03$, $0<c \le 0.02$, or $0<c \le 0.01$.

In some embodiments, it satisfies $0<d \le 0.45$. Optionally, it satisfies $0<d \le 0.40$, $0<d \le 0.35$, $0<d \le 0.30$, $0<d \le 0.25$, $0<d \le 0.20$, $0<d \le 0.15$, or $0<d \le 0.10$.

In some embodiments, it satisfies $e=0$.

In some embodiments, it satisfies $0<e \le 0.5$. Optionally, it satisfies $0<e \le 0.45$, $0<e \le 0.40$, $0<e \le 0.35$, $0<e \le 0.30$, $0<e \le 0.25$, $0<e \le 0.20$, $0<e \le 0.15$, $0<e \le 0.10$, or $0<e \le 0.05$.

In some embodiments, it satisfies $f=2$, and $g=0$.

In some embodiments, it satisfies $f=0$, and $g=2$.

In some embodiments, it satisfies $0<f<2$, $0<g<2$, and $f+g=2$.

As an example, layered materials with the molecular formula of $Li_aNi_bCo_cM1_dM2_eO_fA_g$ include, but are not limited to, one or more of $LiNi_{0.7}Mn_{0.3}O_2$, $LiNi_{0.69}Co_{0.01}Mn_{0.3}O_2$, $LiNi_{0.68}Co_{0.02}Mn_{0.3}O_2$, $LiNi_{0.65}Co_{0.05}Mn_{0.3}O_2$, $LiNi_{0.63}Co_{0.07}Mn_{0.3}O_2$, and $LiNi_{0.61}Co_{0.09}Mn_{0.3}O_2$.

$Li_aNi_bCo_cM1_dM2_eO_fA_g$ can be prepared according to conventional methods in the art. An exemplary preparation method is as follows: a lithium source, a nickel source, a cobalt source, an M1 element precursor, an optional M2 element precursor, and an optional A element precursor are mixed and then sintered. The sintering atmosphere may be an oxygen-containing atmosphere, for example, an air atmosphere or an oxygen atmosphere. The $O_2$ concentration of the sintering atmosphere is, for example, 70% to 100%. The sintering temperature and sintering time can be adjusted according to the actual situation. As an example, the lithium source includes, but is not limited to, one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$) and lithium nitrate ($LiNO_3$). As an example, the nickel source includes, but is not limited to, one or more of nickel sulfate, nickel nitrate, nickel chloride, nickel oxalate and nickel acetate. As an example, the cobalt source includes, but is not limited to, one or more of cobalt sulfate, cobalt nitrate, cobalt chloride, cobalt oxalate and cobalt acetate. As an example, the M1 element precursor includes, but is not limited to, one or more of oxides, nitric acid compounds, carbonic acid compounds, hydroxide compounds, and acetic acid compounds of the M1 element. As an example, the M2 element precursor includes, but is not limited to, one or more of oxides, nitric acid compounds, carbonic acid compounds, hydroxide compounds, and acetic acid compounds of the M2 element. As an example, the A element precursor includes, but is not limited to, one or more of ammonium fluoride, lithium fluoride, hydrogen fluoride, ammonium chloride, lithium chloride, hydrogen chloride, ammonium nitrate, ammonium nitrite, ammonium carbonate, ammonium bicarbonate, ammonium phosphate, phosphoric acid, ammonium sulfate, ammonium bisulfate, ammonium bisulfite, ammonium sulfite, ammonium bisulfide, hydrogen sulfide, lithium sulfide, ammonium sulfide, and elemental sulfur.

In some embodiments, the electrolyte solution further comprises fluoroethylene carbonate (FEC). Based on the total mass of the electrolyte solution, the percentage mass content of the fluoroethylene carbonate is y %, with $0 \le y \le 2.5$. For example, y is 0, 0, 10, 0.20, 0.50, 0.75, 1.0, 1.25, 1.50, 1.75, 2.0, 2.25, 2.50 or within a range consisting of any of the above numerical values. Optionally, it satisfies $0<y\le2.5$, $0<y\le2.25$, $0<y\le2.0$, $0<y\le1.75$, $0<y\le1.5$, $<y\le1.25$, $0<y\le1.0$, $0<y\le0.75$, or $0<y\le0.5$.

For secondary batteries, fluoroethylene carbonate can undergo reductive decomposition at high potentials, and form a solid electrolyte interphase film (SEI film for short) with certain flexibility on the surface of the negative electrode active material. At the same time, it can inhibit the reductive decomposition of organic solvents with a lower potential and inhibit the intercalation of the organic solvent into negative electrode active materials. Therefore, adding fluoroethylene carbonate to the electrolyte solution can effectively improve the cycling performance of the secondary battery. In addition, fluoroethylene carbonate is resistant to high-voltage oxidation, which is conducive to matching high-voltage positive electrode active materials, thereby improving the energy density of secondary batteries.

In some embodiments, the percentage mass content x % of lithium difluoro(oxalato)borate and the percentage mass content y % of fluoroethylene carbonate also satisfy $0.5\le y/x\le2.0$. Optionally, they satisfy $0.5\le y/x\le1.9$, $0.5\le y/x\le1.8$, $0.5\le y/x\le1.7$, $0.5\le y/x\le1.6$, $0.5\le y/x\le1.5$, $0.5\le y/x\le1.4$, $0.5\le y/x\le1.3$, $0.5\le y/x\le1.2$, $0.5\le y/x\le0.1$, or $0.5\le y/x\le1.0$.

Adding fluoroethylene carbonate to the electrolyte solution is capable of effectively improving the cycling performance of the secondary battery. However, HF will be formed when fluoroethylene carbonate decomposes, and HF will destroy the structural stability of the positive electrode active material, increase the gas evolution of the secondary battery, and deteriorate the storage performance of the secondary battery. Lithium difluoro(oxalato)borate is used as a stabilizer of the positive electrode active material, and the B atom in it also has the function of interacting with the O atom on the surface of the positive electrode active material, and inhibits the damage of HF to the structure of the positive electrode active material. The combination of lithium difluoro(oxalato)borate and fluoroethylene carbonate is conductive to giving full play to the improvement effect of fluoroethylene carbonate on the cycling performance and energy density of the secondary battery. In addition, the relationship between the percentage mass content x % of lithium difluoro(oxalato)borate and the percentage mass content y % of fluoroethylene carbonate is reasonably controlled so that it satisfies $0.5\le y/x\le2.0$, which can give full play to the synergistic effect of lithium difluoro (oxalato)borate and fluoroethylene carbonate. It not only does not increase the gas evolution of the secondary battery, but also further improves the cycling performance and energy density of the secondary battery.

In some embodiments, the electrolyte solution further comprises lithium fluorosulfonylimide. Optionally, the molecular formula of the lithium fluorosulfonylimide is $LiN(SO_2R_1)SO_2R_2)$, wherein $R_1$ and $R_2$ each independently represent F, or $C_nF_{2n+1}$, and n is an integer from 1 to 10. As an example, the lithium fluorosulfonylimide comprises one or both of lithium bis(fluorosulfonyl)imide (LiFSI) and lithium bis(trifluoromethanesulfonyl)imide (LiTFSI).

Based on the total mass of the electrolyte solution, the percentage mass content of the lithium fluorosulfonylimide is z %, with $0\le z\le2.5$. For example, z is 0, 0.10, 0.20, 0.50, 0.75, 1.0, 1.25, 1.50, 1.75, 2.0, 2.25, 2.50 or within a range consisting of any of the above numerical values. Optionally, it satisfies $0<z\le2.5$, $0<z\le2.25$, $0<z\le2.0$, $0<z\le1.75$, $0<z\le1.50$, $0<z\le1.25$, $0<z\le1.0$, $0<z\le0.75$, or $0<z\le0.50$.

Fluorosulfonylimide anion is a weakly coordinated anion centered on N, containing conjugated groups and strong charge-absorbing —F or —$C_nF_{2n+1}$, the anion charge is highly delocalized, and the force between the anion and lithium ion is weakened. Therefore, the lithium fluorosulfonylimide has low lattice energy and is easy to dissociate, thereby improving the ionic conductivity of the electrolyte solution, reducing the viscosity of the electrolyte solution, and improving the rate performance and low-temperature performance of the secondary battery. Moreover, the lithium fluorosulfonylimide also has high thermal stability and a wider electrochemical window, and can form a LiF-rich SEI film on the surface of the negative electrode active material. The LiF-rich SEI film is thinner, has lower impedance and higher thermal stability, and can reduce the side reaction between the negative electrode active material and the electrolyte solution. Therefore, after adding the lithium fluorosulfonylimide into the electrolyte solution, the rate performance and low-temperature performance of the secondary battery can be significantly improved.

In some embodiments, the percentage mass content x % of lithium difluoro(oxalato)borate and the percentage mass content z % of lithium fluorosulfonylimide also satisfy $0.5\le x/z\le2.0$. Optionally, they satisfies $0.5\le x/z\le1.9$, $0.5\le x/z\le1.8$, $0.5\le x/z\le1.7$, $0.5\le x/z\le1.6$, $0.5\le x/z\le1.5$, $0.5\le x/z\le1.4$, $0.5\le x/z\le1.3$, $0.5\le x/z\le1.2$, $0.5\le x/z\le1.1$, or $0.5\le x/z\le1.0$.

After adding the lithium fluorosulfonylimide in the electrolyte solution, the rate performance and low-temperature performance of the secondary battery can be improved. However, the lithium fluorosulfonylimide is not resistant to high voltage and will corrode the positive electrode current collector (for example, aluminum foil) at a high potential, and increase the side reaction between the positive electrode active material and the electrolyte solution. Also, its film-forming effect on the surface of the positive electrode active material is poor, which easily affects the cycling performance of the secondary battery. For the combination of lithium difluoro(oxalato)borate and lithium fluorosulfonylimide, lithium difluoro(oxalato)borate as a stabilizer for the positive electrode active material can form a low-impedance protective film with excellent performance on the surface of the positive electrode active material to suppress the side reaction between the positive electrode active material and the electrolyte solution. Therefore, the combination of lithium difluoro(oxalato)borate and lithium fluorosulfonylimide is conducive to giving full play to the improvement effect of lithium fluorosulfonylimide on the rate performance and low-temperature performance of secondary batteries. In addition, the relationship between the percentage mass content x % of lithium difluoro(oxalato) borate and the percentage mass content z % of lithium fluorosulfonylimide is reasonably controlled to satisfy $0.5 \leq x/z \leq 2.0$, which can give full play to the synergistic effect of lithium difluoro(oxalato)borate and lithium fluorosulfonylimide. It not only does not deteriorate the cycling performance of the secondary battery, but can further improve the rate performance and low-temperature performance of the secondary battery.

In some embodiments, the electrolyte solution further comprises both fluoroethylene carbonate and lithium fluorosulfonylimide.

In some embodiments, the secondary battery also satisfies $0.5 \leq y/x \leq 2.0$ and $0.5 \leq x/z \leq 2.0$ simultaneously. Moreover, the secondary battery further satisfies $0.55 \leq y/x \leq 2.0$, $0.5 \leq x/z \leq 2.0$ and $0.25 \leq y/z \leq 2.0$ simultaneously. In this case, the secondary battery has significantly improved cycling performance, storage performance, rate performance, and low-temperature performance simultaneously.

Fluoroethylene carbonate can effectively improve the cycling performance of secondary batteries, and lithium fluorosulfonylimide can improve the rate performance and low-temperature performance of secondary batteries. Lithium difluoro(oxalato)borate is used as a stabilizer for positive electrode active materials, and can form a low-impedance protective film with excellent performance on the surface of the positive electrode active material, which significantly improves the lithium ion diffusion rate of the low-cobalt or cobalt-free positive electrode active material, and at the same time inhibits the side reaction between the positive electrode active material and the electrolyte solution, and inhibits the destruction of the structure of the positive electrode activity material by HF. Therefore, reasonable control of the relationship between the contents of fluoroethylene carbonate, lithium fluorosulfonylimide and lithium difluoro(oxalato)borate is conducive to giving full play to the synergistic effect between the three and fully inhibiting the defects found when each of them is used alone.

The electrolyte solution of the secondary battery of the present application is conducive to matching the high-voltage positive electrode active material, thereby further improving the energy density of the secondary battery. In some embodiments, when the charge capacity per unit area of the positive electrode plate is 90% of the capacity per unit area of the negative electrode plate, the positive electrode charging voltage is ≥4.1V. When the charge capacity of the positive electrode plate is 100% of the test capacity of the negative electrode plate, the positive electrode charging voltage is ≥4.2V.

As an example, the positive electrode charging voltage is tested as follows.

(1) Ethylene carbonate (EC), ethyl methyl carbonate (EMC), and diethyl carbonate (DEC) in a volume ratio of 1:1:1 are mixed, and then $LiPF_6$ is uniformly dissolved in the above solution to obtain an electrolyte solution with the concentration of $LiPF_6$ being 1 mol/L; the negative electrode plate is cut into small discs with unit area, and assembled together with a metal lithium plate as the counter electrode, and a polyethylene film as the separator into a CR2430-type button battery in an argon-protected glove box. The resulting button battery is allowed to stand for 12 h, then discharged to 0.005V at a constant current of 0.1 mA at 25° C., and then charged to 2V at a constant current of 0.1 mA. The charge capacity of the button battery is recorded and used as the capacity of the negative electrode plate per unit area.

(2) Ethylene carbonate (EC), ethyl methyl carbonate (EMC), and diethyl carbonate (DEC) in a volume ratio of 1:1:1 are mixed, and then $LiPF_6$ is uniformly dissolved in the above solution to obtain an electrolyte solution with the concentration of $LiPF_6$ being 1 mol/L; the positive electrode plate is cut into small discs with unit area, and assembled together with a metal lithium plate as the counter electrode, and a polyethylene film as the separator into a CR2430-type button battery in an argon-protected glove box. The resulting button battery is allowed to stand for 12 h, and then charged at 25° C. with a constant current of 0.1 mA. When the charge capacity of the button battery is 90% and 100% of the capacity of the negative electrode plate per unit area obtained in step (1), the corresponding voltages are respectively recorded and used as the positive electrode charging voltage.

In some embodiments, the secondary battery comprises an electrolyte solution and a positive electrode plate. The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \leq a \leq 1.2$, $0<b<0.98$, $0 \leq c<0.1$, $0<d<0.5$, $0 \leq e \leq 0.5$, $0 \leq f \leq 2$, $0 \leq g \leq 2$, $b+c+d+e=1$, and $f+g=2$. The electrolyte solution comprises lithium difluoro(oxalato)borate and fluoroethylene carbonate, and based on the total mass of the electrolyte solution, the percentage mass content of the lithium difluoro(oxalato)borate is x %, with $0<x \leq 1.0$, and the percentage mass content of the fluoroethylene carbonate is y %, with $0 \leq y \leq 2.5$. The secondary battery satisfies $c+x/10 \geq 0.10$ and $0.5 \leq y/x \leq 2.0$.

In some embodiments, the secondary battery comprises an electrolyte solution and a positive electrode plate. The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \leq a \leq 1.2$, $0<b<0.98$, $0 \leq c<0.1$, $0<d<0.5$, $0 \leq e \leq 0.5$, $05 \leq f \leq 2$, $0 \leq g \leq 2$, $b+c+d+e=1$, and $f+g=2$. The electrolyte solution comprises lithium difluoro(oxalato)borate and lithium fluorosulfonylimide, and the lithium fluorosulfonylimide comprises one or both of lithium bis(fluorosulfonyl)imide and lithium bis(trifluoromethanesulfonyl) imide. Based on the total mass of the electrolyte solution, the percentage mass content of the lithium difluoro(oxalato) borate is x %, with $0<x \leq 1.0$, and the percentage mass content of the lithium fluorosulfonylimide is z %, with $0 \leq z \leq 2.5$. The secondary battery satisfies $c+x/10 \geq 0.10$ and $0.5 \leq x/z \leq 2.0$.

In some embodiments, the secondary battery comprises an electrolyte solution and a positive electrode plate. The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.85 \le a \le 1.2$, $0<b<0.98$, $0 \le c<0.1$, $0<d<0.5$, $0 \le e \le 0.5$, $0 \le f \le 2$, $0 \le g \le 2$, $b+c+d+e=1$, and $f+g=2$. The electrolyte solution comprises lithium difluoro(oxalato)borate, fluoroethylene carbonate and lithium fluorosulfonylimide, and the lithium fluorosulfonylimide comprises one or both of lithium bis(fluorosulfonyl)imide and lithium bis(trifluoromethanesulfonyl)imide. Based on the total mass of the electrolyte solution, the percentage mass content of the lithium difluoro(oxalato)borate is x %, with $0<x \le 1.0$, the percentage mass content of the fluoroethylene carbonate is y %, with $0 \le y \le 2.5$, and the percentage mass content of the lithium fluorosulfonylimide is z %, with $0 \le z \le 2.5$. The secondary battery satisfies $c+x/10 \le 0.10$, $0.5 \le y/x \le 2.0$ and $0.5 \le x/z \le 2.0$.

In some embodiments, the secondary battery comprises an electrolyte solution and a positive electrode plate. The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N. P and S, with $0.8 \le a \le 1.2$, $0<b<0.98$, $0 \le c<0.1$, $0<d<0.5$, $0 \le e \le 0.5$, $0 \le f \le 2$, $0 \le g \le 2$, $b+c+d+e=1$, and $f+g=2$. The electrolyte solution comprises lithium difluoro(oxalato)borate, fluoroethylene carbonate and lithium fluorosulfonylimide, and the lithium fluorosulfonylimide comprises one or both of lithium bis(fluorosulfonyl)imide and lithium bis(trifluoromethanesulfonyl)imide. Based on the total mass of the electrolyte solution, the percentage mass content of the lithium difluoro(oxalato)borate is x %, with $0<x \le 1.0$, the percentage mass content of the fluoroethylene carbonate is y %, with $0 \le y \le 2.5$, and the percentage mass content of the lithium fluorosulfonylimide is z %, with $0 \le z \le 2.5$. The secondary battery satisfies $c+x/10 \ge 0.10$, $0.5 \le y/x \le 2.0$, $0.5 \le x/z \le 2.0$ and $0.25 \le y/z \le 2.0$.

In some embodiments, the electrolyte solution further comprises an electrolyte salt and an organic solvent. Types of the electrolyte salt and organic solvent are not specifically limited, and may be selected based on actual requirements.

As an example, the electrolyte salt may comprise one or more of lithium hexafluorophosphate $LiPF_6$, lithium tetrafluoroborate $LiBF_4$, lithium perchlorate $LiClO_4$, lithium hexafluoroarsenate $LiAsF_6$, lithium trifluoromethanesulfonate LiTFS, lithium bis(oxalato)borate LiBOB, lithium difluorophosphate $LiPO_2F_2$, lithium difluoro bis(oxalato) phosphate LiDFOP and lithium tetrafluoro(oxalato)phosphate LiTFOP. Optionally, the electrolyte salt comprises $LiPF_6$.

As an example, the organic solvent may comprise one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS) and ethylsulfonylethane (ESE).

In an embodiment of the secondary battery of the present application, the electrolyte solution does not exclude other components than the above-mentioned components. In some embodiments, the electrolyte solution may optionally comprise other additives, such as an additive for improving the overcharge performance of the battery, an additive for improving the high-temperature performance of the battery, and an additive for improving the low-temperature power performance of the battery.

The electrolyte solution can be prepared in accordance with the conventional method in the art. For example, an organic solvent, electrolyte salt, lithium difluoro(oxalato) borate, optional fluoroethylene carbonate, and optional lithium fluorosulfonylimide can be uniformly mixed to obtain an electrolyte solution. The order of adding the materials is not particularly limited. For example, the electrolyte salt, lithium difluoro(oxalato)borate, optional fluoroethylene carbonate, optional lithium fluorosulfonylimide are added to the organic solvent and mixed uniformly, to obtain an electrolyte solution; or, the electrolyte salt is first added to the organic solvent, and then the lithium difluoro(oxalato) borate, optional fluoroethylene carbonate, and optional lithium fluorosulfonylimide are added to the organic solvent and mixed evenly, to obtain an electrolyte solution.

In some embodiments, the positive electrode plate comprises a positive electrode current collector, and a positive electrode film layer arranged on at least one surface of the positive electrode current collector and comprising a positive electrode active material. For example, the positive electrode current collector has two opposite surfaces in the direction of its own thickness, and the positive electrode film layer is provided on either or both of the two opposite surfaces of the positive electrode current collector.

The positive electrode current collector may be a metal foil or a composite current collector. As an example of the metal foil, an aluminum foil can be used. The composite current collector may comprise a high molecular material substrate layer and a metal material layer formed on at least one surface of the high molecular material substrate layer. As an example, the metal material may comprise one or more of aluminum, aluminum alloy, nickel, nickel alloy, titanium, titanium alloy, silver, and silver alloy. As an example, the high molecular material substrate layer may comprise, for example, polypropylene (PP), polyethylene terephthalate (PET), polybutylene terephthalate (PBT), polystyrene (PS), and polyethylene (PE).

The positive electrode film layer typically comprises a positive electrode active material, an optional binder and an optional conductive agent. The positive electrode film layer is usually formed by coating a positive electrode slurry on the positive electrode current collector, followed by drying and cold pressing. The positive electrode slurry is generally formed by dispersing the positive electrode active material, the optional conductive agent, the optional binder and any other components in a solvent and sufficiently stirring the mixture. The solvent may be N-methyl pyrrolidone (NMP), but is not limited thereto. As an example, the binder for the positive electrode film layer may comprise one or more of polyvinylidene fluoride (PVDF), polytetrafluoroethylene PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluorine-containing acrylate resin. As an example, the conductive agent for the positive electrode film layer can comprise one or more of superconducting carbon, conductive graphite, acetylene black, carbon black, Ketjen black, carbon dots, carbon nanotubes, graphene and carbon nanofibers.

In some embodiments, the positive electrode active material comprises the above-mentioned layered material having the molecular formula of $Li_aNi_bCo_cM1_dM2_eO_fA_g$.

In some embodiments, the surface of $Li_aNi_bCo_cM1_dM2_eO_fA_g$ may also have a cladding layer, such as a carbon cladding layer. The carbon cladding layer is conducive to stabilizing the surface of the positive electrode active material, further reducing the charge transfer resistance of the positive electrode active material, and reducing the diffusion resistance of lithium ions in the bulk phase of the positive electrode active material. Optionally, the carbon cladding layer is amorphous carbon, such as soft carbon and hard carbon.

In some embodiments, the positive electrode active material does not exclude other components than $Li_aNi_bCo_cM1_dM2_eO_fA_g$. For example, the positive electrode active material further comprises one or more of olivine-structured lithium-containing phosphates, and their modified compounds. As an example, the olivine-structured lithium-containing phosphate may comprise, but are not limited to, one or more of lithium iron phosphate, composites of lithium iron phosphate and carbon, lithium manganese phosphate, composites of lithium manganese phosphate and carbon, lithium manganese iron phosphate, composites of lithium manganese iron phosphate and carbon, and their respective modified compounds. The present application is not limited to these materials, and other conventionally known materials that can be used as positive electrode active materials for secondary batteries can also be used. It is possible to use only one of these positive electrode active materials alone, or to use more than two in combination.

In some embodiments, based on the total mass of the positive electrode film layer, the percentage mass content of the layered material with the molecular formula of $Li_aNi_bCo_cM1_dM2_eO_fA_g$ is 80% to 99%. For example, the percentage mass content of the layered material with the molecular formula of $Li_aNi_bCo_cM1_dM2_eO_fA_g$ is 80%, 81%, 82%, 83%, 84%, 85%, 86%, 87%, 88%, 89%, 90%, 91%, 92%, 93%, 94%, 95%, 96%, 97%, 98%, 99% or within a range consisting of any of the above numerical values. Optionally, the percentage mass content of the layered material with the molecular formula of $Li_aNi_bCo_cM1_dM2_eO_fA_g$ is 85%-99%, 90%-99%, 95%-99%, 80%-98%, 85%-98%, 90%-98%, 95%-98%, 80%-97%, 85%-97%, 90%-97%, or 95%-97%.

The positive electrode plate does not exclude other additional functional layers other than the positive electrode film layer. For example, in some embodiments, the positive electrode plate in the present application further comprises a conductive primer coating (e.g., composed of a conductive agent and a binder) sandwiched between the positive electrode current collector and the positive electrode film layer and arranged on the surface of the positive electrode current collector. In some other embodiments, the positive electrode plate of the present application further comprises a protective layer covering the surface of the positive electrode film layer.

The secondary battery of the present application further comprises a negative electrode plate. In some embodiments, the negative electrode plate comprises a negative electrode current collector and a negative electrode film layer provided on at least one surface of the negative electrode current collector. For example, the negative electrode current collector has two opposite surfaces in the direction of its own thickness, and the negative electrode film layer is provided on either or both of the two opposite surfaces of the negative electrode current collector.

The negative electrode current collector may be a metal foil or a composite current collector. As an example of the metal foil, a copper foil can be used. The composite current collector may comprise a high molecular material substrate layer and a metal material layer formed on at least one surface of the high molecular material substrate layer. As an example, the metal material may comprise one or more of copper, copper alloy, nickel, nickel alloy, titanium, titanium alloy, silver, and silver alloy. As an example, the high molecular material substrate layer may comprise, for example, polypropylene (PP), polyethylene terephthalate (PET), polybutylene terephthalate (PBT), polystyrene (PS), and polyethylene (PE).

The negative electrode film layer generally comprises a negative electrode active material, an optional binder, an optional conductive agent and other optional auxiliaries. The negative electrode film layer is usually formed by coating a negative electrode slurry on the negative electrode current collector, followed by drying and cold pressing. The negative electrode slurry is generally formed by dispersing the negative electrode active material, the optional conductive agent, the optional binder, and other optional auxilianes in a solvent and sufficiently stirring the mixture. The solvent may be N-methyl pyrrolidone (NMP) or deionized water, but is not limited thereto. As an example, the binder for the negative electrode film layer may comprise one or more of styrene butadiene rubber (SBR), water-soluble unsaturated resin SR-1B, water-based acrylic resin (such as polyacrylic acid (PAA), polymethacrylic acid (PMAA), and sodium polyacrylate (PAAS)), polyacrylamide (PAM), polyvinyl alcohol (PVA), sodium alginate (SA) and carboxymethyl chitosan (CMCS). As an example, the conductive agent for the negative electrode film layer may comprise one or more of superconducting carbon, acetylene black, carbon black, Ketjen black, carbon dot, carbon nanotube, graphene, and carbon nanofiber. Other optional auxiliaries may comprise thickeners (e.g., sodium carboxymethyl cellulose (CMC-Na)), PTC thermistor material and the like.

The negative electrode active material may use a negative electrode active material known in the art for use in secondary batteries. As an example, the negative electrode active material may comprise one or more of natural graphite, artificial graphite, soft carbon, hard carbon, silicon-based material, tin-based material, and lithium titanate. The silicon-based material may be selected from one or more of elemental silicon, silicon oxide, silicon-carbon composite, silicon-nitrogen composite, and silicon alloy. The tin-based material may comprise one or more of elemental tin, tin oxide, and tin alloy. The present application is not limited to these materials, and other conventionally known materials that can be used as negative electrode active materials for secondary batteries can also be used. It is possible to use only one of these negative active materials alone, or to use more than two in combination.

The negative electrode plate does not exclude other additional functional layers other than the negative electrode film layer. For example, in some embodiments, the negative electrode plate of the present application further comprises a conductive primer coating (e.g., composed of a conductive agent and a binder) sandwiched between the negative electrode current collector and the negative electrode film layer and arranged on the surface of the negative electrode current collector. In some other embodiments, the negative electrode plate of the present application further comprises a protective layer covering the surface of the negative electrode film layer.

The secondary battery according to the present application further comprises a separator. The separator is provided between the positive electrode plate and the negative electrode plate and functions to separate. The type of the separator is not particularly limited in the present application, and any well-known separator with a porous structure having good chemical stability and mechanical stability may be selected.

In some embodiments, the material of the separator may comprise one or more of glass fiber, non-woven cloth, polyethylene, polypropylene, and polyvinylidene fluoride. The separator may be a single-layer film or a multi-layer composite film. When the separator is a multi-layer composite film, the materials of the layers may be the same or different.

In some embodiments, the positive electrode plate, the separator and the negative electrode plate can be made into an electrode assembly by a winding process or a stacking process.

In some embodiments, the secondary battery may include an outer package. The outer package can be used to encapsulate the above-mentioned electrode assembly and electrolyte solution. The outer package of the secondary battery may be a hard shell, such as a hard plastic shell, an aluminum shell, and a steel shell. The outer package of the secondary battery may also be a soft pack, such as a bag-type soft pack. The material of the soft package can be plastic, such as one or more of polypropylene (PP), polybutylene terephthalate (PBT), and polybutylene succinate (PBS).

The present application has no particular limitation on the shape of the secondary battery, which can be cylindrical, square or of any other shape. For example, FIG. 1 shows a secondary battery 5 with a square structure as an example.

Figure 2:
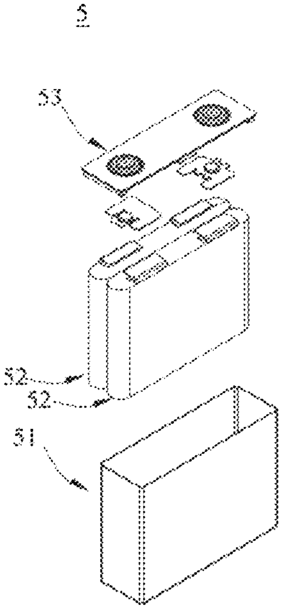
FIG. 2 is an exploded schematic view of the embodiment of the secondary battery shown in FIG. 1.

In some embodiments, as shown in FIG. 2, the outer package can include a case 51 and a cover plate 53. The case 51 may include a bottom plate and a side plate connected to the bottom plate, with the bottom plate and the side plate enclosing to form an accommodating cavity. The case 51 has an opening that communicates with the accommodating cavity, and the cover plate 53 is used to cover the opening to close the accommodating cavity. The positive electrode plate, the negative electrode plate, and the separator may be formed into an electrode assembly 52 by a winding process or a stacking process. The electrode assembly 52 is encapsulated within the accommodating cavity. The electrolyte solution impregnates the electrode assembly 52. The number of electrode assemblies 52 contained in the secondary battery 5 can be one or more, which can be adjusted according to requirements.

Method for Preparing Secondary Battery

A second aspect of the embodiments of the present application provides a method for preparing a secondary battery, and the method at least comprises step 1 and step 2.

Step 1, assembling a positive electrode plate, a separator, a negative electrode plate, and an electrolyte solution into a secondary battery.

The positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \le a \le 1.2$, $0<b<0.98$, $0 \le c<0.1$, $0<d<0.5$, $0 \le e \le 0.5$, $0 \le f \le 2$, $0 \le g \le 2$, $b+c+d+e=1$, and $f+g=2$.

The electrolyte solution comprises lithium difluoro(oxalato)borate, optional fluoroethylene carbonate, and optional lithium fluorosulfonylimide, wherein based on the total mass of the electrolyte solution, the percentage mass content of the lithium difluoro(oxalato)borate is x %, with $0<x \le 1.0$, based on the total mass of the electrolyte solution, the percentage mass content of the fluoroethylene carbonate is y %, with $0 \le y \le 2.5$, and based on the total mass of the electrolyte solution, the percentage mass content of the lithium fluorosulfonylimide is z %, with $0 \le z \le 2.5$.

Step 2, selecting secondary batteries satisfying $c+x/10 \ge 0.10$ from the secondary batteries obtained in step 1.

When the secondary battery satisfies $c+x/10 \ge 0.10$, the B atom in the lithium difluoro(oxalato)borate can fully bind to the O atom in the positive electrode active material, which better reduces the diffusion resistance of lithium ions in the bulk phase of the low-cobalt or cobalt-free positive electrode active material, and avoids excessive dilithiation on the surface of the low-cobalt or cobalt-free positive electrode active material, thereby helping to better stabilize the crystalline structure of the low-cobalt or cobalt-free positive electrode active material and improve the diffusion rate of lithium ions. Therefore, the secondary batteries obtained by the preparation method of the present application can have both significantly improved cycling performance and good high-temperature storage performance.

In some embodiments, the molecular formula of the lithium fluorosulfonylimide is $LiN(SO_2R_1)(SO_2R_2)$, wherein $R_1$ and $R_2$ each independently represent F, or $C_nF_{2n+1}$, and n is an integer from 1 to 10. Optionally, the lithium fluorosulfonylimide comprises one or both of lithium bis(fluorosulfonyl)imide (LiFSI) and lithium bis(trifluoromethanesulfonyl)imide (LiTFSI).

In some embodiments, the method further comprises a step of selecting secondary batteries satisfying $0.5 \le y/x \le 2.0$ from the secondary batteries obtained in step 2. In this case, the prepared secondary battery has good storage performance and significantly improved cycling performance and energy density simultaneously.

In some embodiments, the method further comprises a step of selecting secondary batteries satisfying $0.5 \le x/z \le 2.0$ from the secondary batteries obtained in step 2. In this case, the prepared secondary battery has good storage performance and significantly improved cycling performance, rate performance, and low-temperature performance simultaneously.

In some embodiments, the method further comprises a step of selecting secondary batteries simultaneously satisfying $0.5 \le y/x \le 2.0$ and $0.5 \le x/z \le 2.0$ from the secondary batteries obtained in step 2. In this case, the prepared secondary battery has good storage performance and significantly improved cycling performance, rate performance, and low-temperature performance simultaneously.

In some embodiments, the method further comprises a step of selecting secondary batteries simultaneously satisfying $0.5 \le y/x \le 2.0$, $0.5 \le x/z \le 2.0$ and $0.25 \le y/z \le 2.0$ from the secondary batteries obtained in step 2. In this case, the prepared secondary battery has good storage performance and significantly improved cycling performance, rate performance, and low-temperature performance simultaneously.

Battery Modules and Battery Packs

In some embodiments of the present application, the secondary battery according to the present application can be assembled into a battery module, the number of secondary batteries comprised in the battery module can be multiple, and the specific number can be adjusted according to the application and capacity of the battery module.

Figure 3:
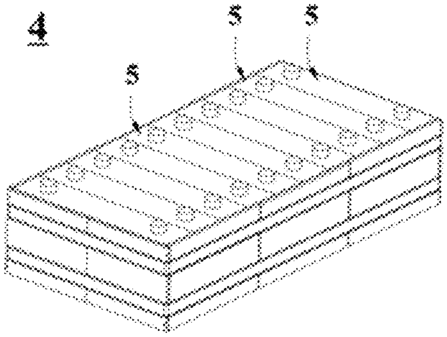
FIG. 3 is a schematic diagram of an embodiment of a battery module according to the present application.

FIG. 3 is a schematic diagram of a battery module 4 as an example. As shown in FIG. 3, in the battery module 4, a plurality of secondary batteries 5 can be sequentially arranged along the length direction of the battery module 4. Of course, they can be arranged in any other way. The plurality of secondary batteries 5 may further be fixed by fasteners.

Optionally, the battery module 4 can further comprise a case having an accommodating space, in which the plurality of secondary batteries 5 are accommodated.

In some embodiments, the aforementioned battery modules can further be assembled into a battery pack, and the number of battery modules included in the battery pack can be adjusted according to the application and capacity of the battery pack.

Figure 4:
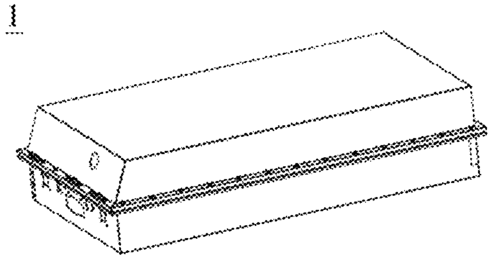
FIG. 4 is a schematic diagram of an embodiment of a battery pack according to the present application.
Figure 5:
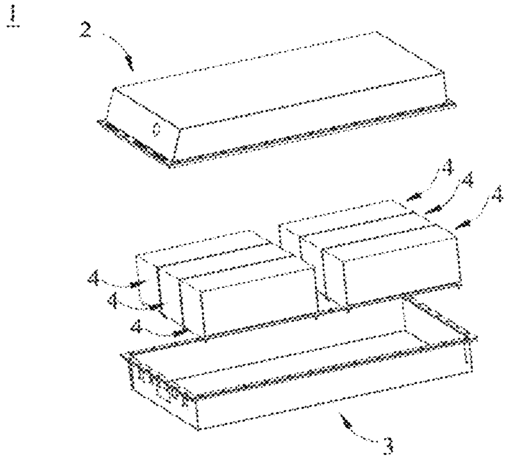
FIG. 5 is an exploded schematic view of the embodiment of the battery pack shown in FIG. 4.

FIGS. 4 and 5 are schematic diagrams of a battery pack 1 as an example. As shown in FIGS. 4 and 5, the battery pack 1 may comprise a battery box and a plurality of battery modules 4 provided in the battery box. The battery box comprises an upper box 2 and a lower box 3, wherein the upper box 2 is used to cover the lower box 3 to form an enclosed space for accommodating the battery modules 4. The plurality of battery modules 4 may be arranged in the battery box in any manner.

Electrical Apparatus

An embodiment of the present application further provides an electrical apparatus comprising at least one of the secondary battery, battery module, or battery pack of the present application. The secondary battery, battery module, or battery pack may be used as a power source for the electrical apparatus, and may also be used as an energy storage unit for the electrical apparatus. The electrical apparatus may be, but is not limited to, a mobile device (such as a mobile phone, a laptop), an electric vehicle (such as an all-electric vehicle, a hybrid electric vehicle, a plug-in hybrid electric vehicle, an electric bicycle, an electric scooter, an electric golf cart, an electric truck), an electric train, a ship, a satellite, an energy storage system, etc.

For the electrical apparatus, the secondary battery, the battery module, or the battery pack can be selected according to the use requirements of the electrical apparatus.

Figure 6:
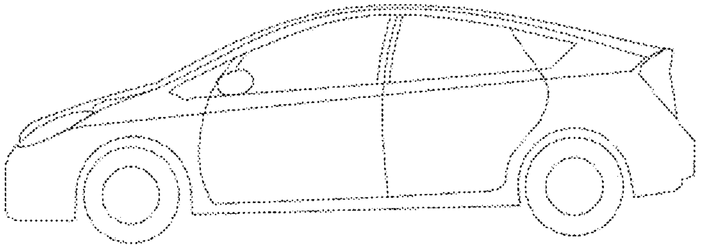
FIG. 6 is a schematic diagram of an embodiment of an electrical apparatus comprising a secondary battery according to the present application as a power source.

FIG. 6 is a schematic diagram of an electrical apparatus as an example. The electrical apparatus is an all-electric vehicle, a hybrid electric vehicle or a plug-in hybrid electric vehicle, and the like. In order to meet the requirements of the electrical apparatus for high power and high energy density, a battery pack or a battery module may be used.

As another example, the electrical apparatus may be a mobile phone, a tablet, a laptop, etc. The electrical apparatus is generally required to be light and thin, and can use a secondary battery as a power source.

EMBODIMENTS

The following Embodiments describe the disclosure of the present application in more detail and are provided for illustrative purposes only, as various modifications and changes within the scope of the disclosure of the present application will be apparent to those skilled in the art. Unless otherwise stated, all parts, percentages, and ratios reported in the following Embodiments are on a weight basis, and all reagents used in the Embodiments are commercially available or can be obtained by synthesis according to conventional methods, and can be directly used without further treatment, and the instruments used in the Embodiments are commercially available.

Embodiment 1

Preparation of Positive Electrode Plate

The positive electrode active material $LiNi_{0.65}Co_{0.05}Mn_{0.3}O_2$, conductive agent carbon black and binder polyvinylidene fluoride (PVDF) in a weight ratio of 97.5:1.4:1.1 are mixed in a proper amount of solvent NMP with sufficient stirring to form a uniform positive electrode slurry; the positive electrode slurry is evenly coated on the surface of a positive electrode current collector aluminum foil, and after drying and cold pressing, a positive electrode plate is obtained.

Preparation of Negative Electrode Plate

The negative electrode active material graphite, binder styrene butadiene rubber (SBR), thickener sodium carboxymethyl cellulose (CMC-Na) and conductive agent carbon black (Super P) in a weight ratio of 96.2:1.8:1.2:0.8 are mixed in a proper amount of solvent deionized water with sufficient stirring to form a uniform negative electrode slurry, the negative electrode slurry is evenly coated on the surface of the negative electrode current collector copper foil, and after drying and cold pressing, a negative electrode plate is obtained.

Separator

A porous polyethylene (PE) film is used as the separator.

Preparation of Electrolyte Solution

Ethylene carbonate (EC), methyl ethyl carbonate (EMC) and diethyl carbonate (DEC) are mixed in a volume ratio of 1:1:1 to obtain an organic solvent. $LiPF_6$ and lithium difluoro(oxalato)borate are uniformly dissolved in the above organic solvent to obtain an electrolyte solution, the concentration of $LiPF_6$ is 1 mol/L, and based on the total mass of the electrolyte solution, the percentage mass content of lithium difluoro(oxalato)borate is 0.5%.

Preparation of Secondary Battery

The positive electrode plate, the separator and the negative electrode plate are stacked in sequence and wound to obtain an electrode assembly; the electrode assembly is placed in an outer package, the above electrolyte solution is added thereto, and after packaging, standing, formation, shaping and other procedures, a secondary battery is obtained.

Embodiments 2-25 and Comparative Embodiments 1-3

The methods for preparing the secondary batteries are similar to that of Embodiment 1, except that the type of the positive electrode active material and the preparation parameters of the electrolyte solution are adjusted. The specific parameters are shown in Table 1. In the electrolyte solutions in Embodiments 8-13, fluoroethylene carbonate is further added, lithium bis(fluorosulfonyl)imide is further added in the electrolyte solutions in Embodiments 14-19, and both fluoroethylene carbonate and lithium bis(fluorosulfonyl)imide are further added in the electrolyte solutions of Embodiments 20-25 simultaneously. In Table 1, x % is the percentage mass content of lithium difluoro(oxalato)borate based on the total mass of the electrolyte solution; y % is the percentage mass content of fluoroethylene carbonate based on the total mass of the electrolyte solution, and z % represents the percentage mass content of lithium bis(fluorosulfonyl) imide based on the total mass of the electrolyte solution.

TABLE 1

| No. | Molecular formula of positive electrode active material | x % | c + x/10 | y % | y/x | z % | x/z | y/z |
|---|---|---|---|---|---|---|---|---|
| Embodiment 1 | $LiNi_{0.65}Co_{0.05}Mn_{0.3}O_2$ | 0.5% | 0.10 | / | / | / | / | / |
| Embodiment 2 | $LiNi_{0.65}Co_{0.05}Mn_{0.3}O_2$ | 1.0% | 0.15 | / | / | / | / | / |
| Embodiment 3 | $LiNi_{0.7}Mn_{0.3}O_2$ | 1.0% | 0.10 | / | / | / | / | / |
| Embodiment 4 | $LiNi_{0.69}Co_{0.01}Mn_{0.3}O_2$ | 0.9% | 0.10 | / | / | / | / | / |
| Embodiment 5 | $LiNi_{0.68}Co_{0.02}Mn_{0.3}O_2$ | 0.8% | 0.10 | / | / | / | / | / |
| Embodiment 6 | $LiNi_{0.63}Co_{0.07}Mn_{0.3}O_2$ | 0.3% | 0.10 | / | / | / | / | / |
| Embodiment 7 | $LiNi_{0.61}Co_{0.09}Mn_{0.3}O_2$ | 0.1% | 0.10 | / | / | / | / | / |
| Embodiment 8 | $LiNi_{0.65}Co_{0.05}Mn_{0.3}O_2$ | 0.5% | 0.10 | 0.20% | 0.4 | / | / | / |
| Embodiment 9 | $LiNi_{0.65}Co_{0.05}Mn_{0.3}O_2$ | 0.5% | 0.10 | 0.25% | 0.5 | / | / | / |
| Embodiment 10 | $LiNi_{0.65}Co_{0.05}Mn_{0.3}O_2$ | 0.5% | 0.10 | 0.50% | 1 | / | / | / |
| Embodiment 11 | $LiNi_{0.65}Co_{0.05}Mn_{0.3}O_2$ | 0.5% | 0.10 | 0.75% | 1.5 | / | / | / |
| Embodiment 12 | $LiNi_{0.65}Co_{0.05}Mn_{0.3}O_2$ | 0.5% | 0.10 | 1.00% | 2 | / | / | / |
| Embodiment 13 | $LiNi_{0.65}Co_{0.05}Mn_{0.3}O_2$ | 0.5% | 0.10 | 1.25% | 2.5 | / | / | / |
| Embodiment 14 | $LiNi_{0.65}Co_{0.05}Mn_{0.3}O_2$ | 0.5% | 0.10 | / | / | 1.25% | 0.4 | / |
| Embodiment 15 | $LiNi_{0.65}Co_{0.05}Mn_{0.3}O_2$ | 0.5% | 0.10 | / | / | 1.00% | 0.5 | / |
| Embodiment 16 | $LiNi_{0.65}Co_{0.05}Mn_{0.3}O_2$ | 0.5% | 0.10 | / | / | 0.50% | 1 | / |
| Embodiment 17 | $LiNi_{0.65}Co_{0.05}Mn_{0.3}O_2$ | 0.5% | 0.10 | / | / | 0.33% | 1.5 | / |
| Embodiment 18 | $LiNi_{0.65}Co_{0.05}Mn_{03}O_2$ | 0.5% | 0.10 | / | / | 0.25% | 2 | / |
| Embodiment 19 | $LiNi_{0.65}Co_{0.05}Mn_{0.3}O_2$ | 0.5% | 0.10 | / | / | 0.20% | 2.5 | / |
| Embodiment 20 | $LiNi_{0.65}Co_{0.05}Mn_{0.3}O_2$ | 0.5% | 0.10 | 0.25% | 0.5 | 1.25% | 0.4 | 0.2 |
| Embodiment 21 | $LiNi_{0.65}Co_{0.05}Mn_{0.3}O_2$ | 0.5% | 0.10 | 0.25% | 0.5 | 1.00% | 0.5 | 0.25 |
| Embodiment 22 | $LiNi_{0.65}Co_{0.05}Mn_{0.3}O_2$ | 0.5% | 0.10 | 0.25% | 0.5 | 0.50% | 1 | 0.5 |
| Embodiment 23 | $LiNi_{0.65}Co_{0.05}Mn_{0.3}O_2$ | 0.5% | 0.10 | 0.25% | 0.5 | 0.33% | 1.5 | 0.75 |
| Embodiment 24 | $LiNi_{0.65}Co_{0.05}Mn_{0.3}O_2$ | 0.5% | 0.10 | 0.25% | 0.5 | 0.25% | 2 | 1 |
| Embodiment 25 | $LiNi_{0.65}Co_{0.05}Mn_{0.3}O_2$ | 0.5% | 0.10 | 0.25% | 0.5 | 0.20% | 2.5 | 1.25 |
| Comparative Embodiment 1 | $LiNi_{0.65}Co_{0.05}Mn_{0.3}O_2$ | / | 0.05 | / | / | / | / | / |
| Comparative Embodiment 2 | $LiNi_{0.65}Co_{0.05}Mn_{0.3}O_2$ | 0.2% | 0.07 | / | / | / | / | / |
| Comparative Embodiment 3 | $LiNi_{0.7}Mn_{0.3}O_2$ | 0.5% | 0.05 | / | / | / | / | / |

Tests (1) Normal Temperature Cycling Performance Test of Secondary Battery

At 25° C. the secondary battery is charged to 4.3V at a constant current of 1C, and continues to charge at a constant voltage until the current is 0.05C. At this time, the secondary battery is in a full charge state, and the charge capacity at this time is recorded, which is the charge capacity of cycle 1. After the secondary battery is allowed to stand for 5 min, it is discharged to 2.8V at a constant current of 1C. This is one cyclic charge-discharge process, and the discharge capacity at this time is recorded, which is the discharge capacity of cycle 1. The secondary battery is subjected to the cyclic charge-discharge test according to the above method, and the discharge capacity after each cycle is recorded.

Capacity retention rate (%) of secondary battery after 600 cycles at 25° C.=(discharge capacity after 600 cycles/discharge capacity of cycle 1)×100%.

(2) High-Temperature Cycling Performance Test of Secondary Battery

At 45° C., the secondary battery is charged to 4.3V at a constant current of 1C, and continues to charge at a constant voltage until the current is 0.05C. At this time, the secondary battery is in a full charge state, and the charge capacity at this time is recorded, winch is the charge capacity of cycle 1. After the secondary battery is allowed to stand for 5 min, it is discharged to 2.8V at a constant current of 1C. This is one cyclic charge-discharge process, and the discharge capacity at this time is recorded, which is the discharge capacity of cycle 1. The secondary battery is subjected to the cyclic charge-discharge test according to the above method, and the discharge capacity after each cycle is recorded.

Capacity retention rate (%) of secondary battery after 600 cycles at 45° C.=(discharge capacity after 600 cycles/discharge capacity of cycle 1)×100%.

(3) Initial DC Internal Resistance Test of Secondary Battery

At 25° C., the secondary battery is charged at a constant current of 1C to 4.3V, continues to charge at a constant voltage until the current is 0.05C, and the secondary battery is in a full charge state at this time; the secondary battery is discharged at a constant current of 0.5C and the secondary battery is adjusted to 50% SOC, the voltage of the secondary battery at this time is recorded as $U_1$; the secondary battery is discharged at a constant current of 4C for 30 s, with site sampling at 0.1 s, and the voltage at the end of discharge is recorded as $U_2$.

The discharge DC internal resistance of the secondary battery at 50% SOC is used to represent the initial DC internal resistance of the secondary battery, and the initial DC internal resistance of the secondary battery is $(\Omega)=(U_1-U_2)/4C$.

(4) High-Temperature Storage Performance Test of Secondary Battery

At 60° C., the secondary battery is charged to 4.3V at a constant current of 1C, and continues to charge at a constant voltage until the current is 0.05C. At this time, the volume of the secondary battery is tested by the water displacement method and recorded as $V_0$. The secondary battery is placed into a 60° C. thermostat, stored for 30 d and then taken out. The volume of the secondary battery at this time is tested by the water displacement method and recorded as $V_1$.

Volume expansion rate (%) of secondary battery after storage at 60° C. for 30 $d=[(V_1-V_0/V_0]\times 100\%$.

The performance test results for Embodiments 1-25 and Comparative Embodiments 1-3 are provided in Table 2.

TABLE 2

| No. | Capacity retention rate (%) after 600 cycles at 25° C. | Capacity retention rate (%) after 600 cycles at 45° C. | Volume expansion rate (%) after storage at 60° C. for 30 d | Initial DC internal resistance (Ω) |
|---|---|---|---|---|
| Embodiment 1 | 88.4 | 81.1 | 15.1 | 15.6 |
| Embodiment 2 | 90.7 | 84.0 | 15.0 | 16.0 |
| Embodiment 3 | 84.9 | 78.5 | 15.0 | 15.7 |
| Embodiment 4 | 85.6 | 78.9 | 15.1 | 15.6 |
| Embodiment 5 | 85.3 | 78.5 | 15.2 | 15.6 |
| Embodiment 6 | 85.8 | 78.2 | 15.1 | 15.4 |
| Embodiment 7 | 85.7 | 78.9 | 14.9 | 15.2 |
| Embodiment 8 | 89.0 | 81.4 | 17.7 | 15.7 |
| Embodiment 9 | 91.9 | 85.0 | 15.4 | 16.1 |
| Embodiment 10 | 91.4 | 85.6 | 15.6 | 16.3 |
| Embodiment 11 | 91.3 | 86.0 | 15.8 | 16.5 |
| Embodiment 12 | 91.1 | 85.6 | 16.0 | 16.4 |
| Embodiment 13 | 87.4 | 81.8 | 18.3 | 17.1 |
| Embodiment 14 | 87.9 | 80.7 | 16.4 | 13.1 |
| Embodiment 15 | 88.2 | 80.8 | 14.9 | 13.0 |
| Embodiment 16 | 88.1 | 82.6 | 15.7 | 13.4 |
| Embodiment 17 | 88.3 | 81.0 | 15.2 | 14.4 |
| Embodiment 18 | 88.4 | 81.0 | 15.3 | 14.9 |
| Embodiment 19 | 88.5 | 81.2 | 15.2 | 15.7 |
| Embodiment 20 | 91.3 | 86.4 | 16.4 | 13.2 |
| Embodiment 21 | 92.1 | 86.5 | 14.9 | 13.2 |
| Embodiment 22 | 91.9 | 87.3 | 15.1 | 13.7 |
| Embodiment 23 | 92.1 | 86.7 | 15.1 | 14.6 |
| Embodiment 24 | 92.2 | 86.7 | 15.4 | 15.0 |
| Embodiment 25 | 91.1 | 85.0 | 15.7 | 16.1 |
| Comparative Embodiment 1 | 79.9 | 69.3 | 15.4 | 15.4 |
| Comparative Embodiment 2 | 81.8 | 72.6 | 15.3 | 15.5 |
| Comparative Embodiment 3 | 79.2 | 71.8 | 15.7 | 15.5 |

As can be seen from the test results in Table 2, when lithium difluoro(oxalato)borate is added into the electrolyte solution and the cobalt content c of the low-cobalt or cobalt-free positive electrode active material and the percentage mass content x % of lithium difluoro(oxalato)borate in the electrolyte solution satisfy $c+x/10 \geq 0.10$, the secondary battery has significantly improved cycling performance as well as good high-temperature storage performance. In Comparative Embodiments 1-3, lithium difluoro(oxalato) borate is not added in the electrolyte solution, or the amount of lithium difluoro(oxalato)borate added is insufficient, and in these cases, lithium difluoro(oxalato)borate cannot form a low-impedance protective film with excellent performance on the surface of the low-cobalt or cobalt-free positive electrode active material, and lithium difluoro(oxalato)borate also cannot effectively reduce the charge transfer resistance of the low-cobalt or cobalt-free positive electrode active material, cannot effectively reduce the diffusion resistance of lithium ions in the bulk phase of the low-cobalt or cobalt-free positive electrode active material and inhibit the excessive dilithiation on the surface of the low-cobalt or cobalt-free positive electrode active material. Therefore, it is difficult for the secondary battery to have significantly improved cycling performance.

It can also be seen from the test results in Table 2 that, the relationship between the percentage mass content x % of lithium difluoro(oxalato)borate and the percentage mass content y % of fluoroethylene carbonate is further reasonably controlled to satisfy $0.5 \leq y/x \leq 2.0$, which can give full play to the synergistic effect of lithium difluoro(oxalato) borate and fluoroethylene carbonate. It not only does not increase the gas evolution of the secondary battery, but also further improves the cycling performance of the secondary battery.

It can also be seen from the test results in Table 2 that, the relationship between the percentage mass content x % of lithium difluoro(oxalato)borate and the percentage mass content z % of lithium fluorosulfonylimide is further reasonably controlled to satisfy $0.5 \leq x/z \leq 2.0$, which can give full play to the synergistic effect of lithium difluoro(oxalato) borate and lithium fluorosulfonylimide. It not only does not deteriorate the cycling performance of the secondary battery, but can further reduce the initial DC internal resistance of the secondary battery and improve the rate performance of the secondary battery.

It can also be seen from the test results in Table 2 that, the relationship between the percentage mass content x % of lithium difluoro(oxalato)borate, the percentage mass content y % of fluoroethylene carbonate and the percentage mass content of lithium bis(fluorosulfonyl)imide is further reasonably controlled to satisfy $0.5 \leq y/x \leq 2.0$, $0.5 \leq x/z \leq 2.0$ and $0.25 \leq y/z \leq 2.0$. In this case, the secondary battery can not only have good high-temperature storage performance, but also have significantly improved cycling performance and rate performance.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A secondary battery comprising an electrolyte solution and a positive electrode plate, wherein, the positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \leq a \leq 1.2$, $0<b<0.98$, $0 \leq c<0.1$, $0<d<0.5$, $0 \leq e \leq 0.5$, $0 \leq f \leq 2$, $0 \leq g \leq 2$, $b+c+d+c=1$, and $f+g=2$, the electrolyte solution comprises lithium difluoro(oxalato)borate, and based on a total mass of the electrolyte solution, a percentage mass content of the lithium difluoro(oxalato)borate is x %, with $0<x \leq 1.0$, the secondary battery satisfies $c+x/10 \geq 0.10$, the electrolyte solution further comprises one or more of fluoroethylene carbonate and lithium fluorosulfonylimide, based on the total mass of the electrolyte solution, a percentage mass content of the fluoroethylene carbonate is y %, with $0 \leq y \leq 2.5$; and/or, based on the total mass of the electrolyte solution, a percentage mass content of the lithium fluorosulfonylimide is z %, with $0 \leq z \leq 2.5$, and the secondary battery further satisfies one or both of the following relational expressions (1)-(2):

$$0.5 \leq y/x \leq 2.0; \text{ and} \quad (1)$$

$$0.5 \leq x/z \leq 2.0. \quad (2)$$

2. The secondary battery according to claim 1, wherein a molecular formula of the lithium fluorosulfonylimide is $LiN(SO_2R_1)(SO_2R_2)$, wherein $R_1$ and $R_2$ each independently represent F, or $C_nF_{2n+1}$, and n is an integer from 1 to 10.

3. The secondary battery according to claim 1, wherein the secondary battery further simultaneously satisfies $0.5 \le y/x \le 2.0$, $0.5 \le x/z \le 2.0$ and $0.25 \le y/z \le 2.0$.

4. A method for preparing a secondary battery, at least comprising steps of:

step 1, assembling a positive electrode plate, a separator, a negative electrode plate, and an electrolyte solution into a secondary battery, the positive electrode plate comprises a layered material with a molecular formula of $Li_aNi_bCo_cM1_dM2_eO_fA_g$, wherein M1 is selected from one or both of Mn and Al, M2 is selected from one or more of Si, Ti, Mo, V, Ge, Se, Zr, Nb, Ru, Pd, Sb, Ce, Te and W, and A is selected from one or more of F, N, P and S, with $0.8 \le a \le 1.2$, $0<b<0.98$, $0 \le c<0.1$, $0<d<0.5$, $0 \le e \le 0.5$, $0 \le f \le 2$, $0 \le g \le 2$, $b+c+d+e=1$, and $f+g=2$, the electrolyte solution comprises lithium difluoro(oxalato)borate, optional fluoroethylene carbonate, and optional lithium fluorosulfonylimide, based on the total mass of the electrolyte solution, the percentage mass content of the lithium difluoro(oxalato)borate is x %, with $0<x \le 1.0$, based on the total mass of the electrolyte solution, the percentage mass content of the fluoroethylene carbonate is y %, with $0 \le y \le 2.5$, and based on the total mass of the electrolyte solution, the percentage mass content of the lithium fluorosulfonylimide is z %, with $0 \le z \le 2.5$;

step 2, selecting secondary batteries satisfying $c+x/10 \ge 0.10$ from the secondary batteries obtained in step 1; and step 3, selecting secondary batteries satisfying $0.5 \le y/x \le 2.0$ from the secondary batteries obtained in step 2.

5. The method according to claim 4, further comprising a step of selecting secondary batteries satisfying $0.5 \le x/z \le 2.0$ from the secondary batteries obtained in step 2.

6. The method according to claim 4, further comprising a step of selecting secondary batteries simultaneously satisfying $0.5 \le x/z \le 2.0$ and $0.25 \le y/z \le 2.0$ from the secondary batteries obtained in step 2.

7. A battery module, comprising the secondary battery according to claim 1.

8. A battery pack, comprising the battery module according to claim 7.

9. An electrical apparatus, comprising the battery pack according to claim 8.

10. The secondary battery according to claim 1, wherein the lithium fluorosulfonylimide comprises one or both of lithium bis(fluorosulfonyl)imide and lithium bis(trifluoromethanesulfonyl)imide.

* * * * *